March 18, 1930.   F. H. SHELLEDY   1,751,106
EDUCATIONAL APPLIANCE
Filed June 17, 1927

Inventor
Frederick H. Shelledy

By Donald L. Mawson.
Attorney

Patented Mar. 18, 1930

1,751,106

UNITED STATES PATENT OFFICE

FREDERICK H. SHELLEDY, OF BLADENSBURG, MARYLAND

EDUCATIONAL APPLIANCE

Application filed June 17, 1927. Serial No. 199,520.

This invention relates to improvements in educational appliances, and more particularly to a portable chart or device which will appeal to a small child, and upon which are placed the multiplication tables and addition problems and answers, or other mathematical indicia.

An object of the invention is to provide an improved portable educational chart or appliance, which will appeal to a small child, and will be so constructed that by a slight manipulation, different multiplication tables will be positioned in suitably disposed window openings in the device, or suitable simple mathematical problems and answers will appear in the said window openings, whereby the simple tables and problems will become fixed and memorized in the child's mind, by his simply playing with the appliance and repeatedly looking at the same.

A further object of the invention is to provide a highly efficient educational appliance for teaching children of pre-school age the simple mathematical problems and tables, said appliance being so constructed that it will be quite inexpensive to produce.

Other objects will appear as the description proceeds.

In the accompanying drawings which constitute a part of my application—

Like characters of reference are used throughout the following specification and the accompanying drawings to designate corresponding parts.

Figure 1:
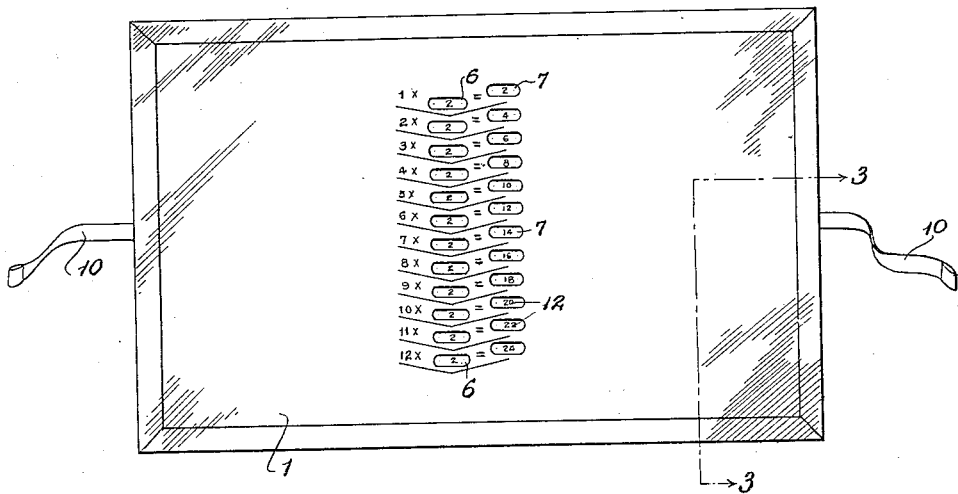
Figure 1 is a front elevation of my improved educational appliance.

My improved educational appliance comprises a front plate 1, and a back plate 2 spaced therefrom, by means of the interposed reinforcing end strips 3 and side strips 4, the whole construction being held together in any desired manner.

Through the front face 1 of the appliance, I form a plurality of vertically alined window openings in two separate rows, the said openings being designated 6 and 7. It will be apparent that the window openings 6 and 7, are not in longitudinal alinement, but are arranged in staggered relation across the face of the appliance. I purposely arrange the openings in this manner, so that the numbers 1 to 12 inclusive will appear down a row on the front plate 1, while the multipliers appear down the row of openings 6, and the answers will simultaneously appear down the row of openings 7. On the front face 1, I intend to inscribe the multiplication sign between the row of numbers 1 to 12 and the row of openings 6, while on the opposite or back of the appliance the addition or subtraction sign will be used instead of the multiplication sign.

Figure 2:
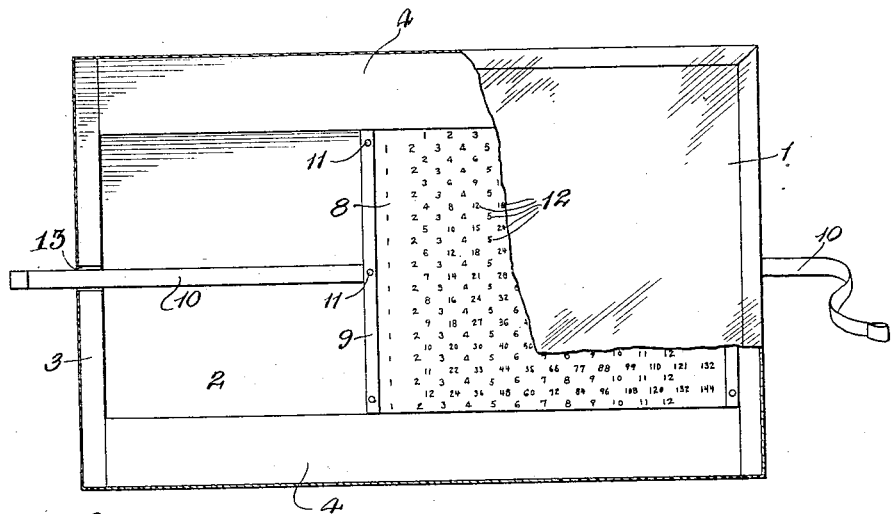
Figure 2 is a partial sectional view showing the front of the table card in elevation.
Figure 3:
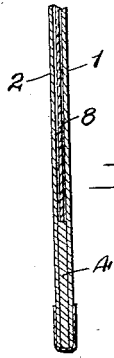
Figure 3 is a sectional view taken on the line 3—3 of Figure 1.

From Figure 2 of the drawings, the exact construction of my table card 8 will be shown. The card 8 is preferably formed from a sheet of celluloid, as are the other portions of the appliance, and is suitably reinforced by the strips 9 at its opposite ends, which also serve to retain the operating tapes 10 attached thereto, by means of the rivets 11. It will be apparent that the strips 9 serve as bearing surfaces for the table card 8, and contact with the inner surfaces of the front and back plates 1 and 2. Openings 13 are formed through the end strips 3, for the passage of the operating tapes 10, which extend out from each end of the said appliance. The end strips 3 also serve to limit the endwise movement of the table card 8 while the side strips 4 serve also to limit the side movement of said table card.

The construction of the table card 8 has just been described, but no mention as yet has been made to the arrangement of the printed numbers 12, thereon. On the side of the card used for learning the multiplication tables, I inscribe the multiplier numbers 1 to 12 inclusive in 12 horizontal rows across the card, while the answers appear in 12 horizontal lines immediately above and between the horizontal multiplier rows. It will thus be seen by this arrangement of the rows of numbers the equations of the several multiplication tables will become visible through the openings 6 and 7. The same arrangement of rows of numbers is placed on the reverse side of the card 8, so that by turning the appliance over the simple mathematical equations of addition from 1 to 12, or if desired, subtraction, may be caused to appear in the openings 6 and 7, in the same manner.

It is believed that with this appliance, a small child will readily and quickly memorize the multiplication tables and the simple equations of addition and subtraction, while using the appliance as a play toy Many minor changes in detail of construction may be resorted to without departure from the spirit of the invention.

Having thus described my invention what I claim as new and desire to secure by Letters Patent of the United States is:

1. An educational appliance comprising a housing having spaced front and back surfaces, said surfaces being provided with offset rows of vertically alined indicia viewing openings, a table card bearing indicia and slidable between said surfaces, and means for operating said card.

2. An educational appliance comprising a housing having spaced front and back plates, reinforcing strips interposed between the sides and ends of said plates, said plates being provided with offset rows of vertically alined indicia viewing window openings, a table card bearing indicia and slidable between said plates, and means secured to said card for operating the same.

3. An educational appliance comprising a housing having spaced front and back plates, reinforcing strips interposed between the sides and ends of said plates, said plates being provided with offset rows of vertically alined indicia viewing window openings, a table card bearing indicia and slidable between said plates, tables on said card, and means for operating said card to cause said tables to appear at said window openings.

4. An educational appliance comprising a housing having spaced front and back plates, reinforcing strips interposed between the sides and ends of said plates and secured thereto, said plates being provided with offset rows of vertically alined indicia viewing window openings, a table card bearing indicia and slidable between said plates, tables arranged in staggered relation on said card, reinforcing means at the opposite ends of said card, and operating tapes attached to said card at its opposite ends adapted to extend through the ends of said appliance.

5. The combination set forth in claim 4, and a unitary means for holding the reinforcing strips to said card, and for holding the operating tapes thereto.

In testimony whereof I affix my signature.

FREDERICK H. SHELLEDY.